United States Patent [19]

Albert et al.

[11] Patent Number: 4,999,026

[45] Date of Patent: Mar. 12, 1991

[54] TRANSFERRING DYES FOR THERMAL PRINTING: TRI-CYANO-VINYL ANILINE DYES

[75] Inventors: Bernhard Albert, Maxdorf; Karl-Heinz Etzbach, Frankenthal; Ruediger Sens, Mannheim, all of Fed. Rep. of Germany

[73] Assignee: BASF Aktiengesellschaft, Ludwigshafen, Fed. Rep. of Germany

[21] Appl. No.: 384,095

[22] Filed: Jul. 24, 1989

Related U.S. Application Data

[63] Continuation of Ser. No. 228,874, Aug. 5, 1988, abandoned, which is a continuation of Ser. No. 89,542, Aug. 26, 1987, abandoned.

[30] Foreign Application Priority Data

Sep. 5, 1986 [DE] Fed. Rep. of Germany ....... 3630279

[51] Int. Cl.[5] ....................... B41M 5/26; C09B 23/14; C09B 29/03

[52] U.S. Cl. .......................................... 8/471; 8/467; 8/662; 8/922; 8/636

[58] Field of Search ........................................... 8/471

[56] References Cited

U.S. PATENT DOCUMENTS 3,441,554 4/1969 Hahn et al. ........................ 534/795

(List continued on next page.)

FOREIGN PATENT DOCUMENTS 30392 2/1985 Japan .
159091 2/1985 Japan .
60-3400364 7/1985 Japan .
60-229786 11/1985 Japan .

(List continued on next page.)

OTHER PUBLICATIONS

Patent Abstracts of Japan, Band 10, Nr. 196 (M-497), [2252], Jul. 10, 1986; JP-A-61 41 598(Matsushita Electric Ind. Co., Ltd.), 27-02-1986.

(List continued on next page.)

*Primary Examiner*—A. Lionel Clingman
*Attorney, Agent, or Firm*—Oblon, Spivak, McClelland, Maier & Neustadt

[57] ABSTRACT

Dyes are transferred from a carrier by sublimation/vaporization to plastic-coated papers by a process in which the dyes used are of the general formula (I)

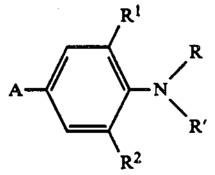

(I)

where A is D—N=N— or

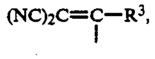

$R^1$ and $R^2$ are each hydrogen, alkyl, alkoxy, alkylthio or halogen and $R^1$ and R together may furthermore form a 5-membered or 6-membered heterocyclic ring, and R and R' independently of one another are each hydrogen, phenyl which is unsubstituted or substituted by methyl or methoxy, or $C_5$- or $C_6$-cycloalkyl or $C_1$-$C_6$-alkyl which is unsubstituted or substituted by $C_1$-$C_4$-alkoxy, $C_1$-$C_4$-alkoxycarbonyl, $C_2$-$C_5$-alkanoyloxy, $C_1$-$C_4$-alkoxycarbonyloxy, $C_1$-$C_4$-alkoxy-$C_2$-or $C_3$-alkoxycarbonyloxy, hydroxyl, cyano, halogen, phenyl or $C_5$- or $C_6$-cycloalkyl, or

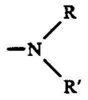

is a 5-membered or 6-membered saturated heterocyclic ring where D is a radical of a diazo component of the thiophene, thiazole, isothiazole or 1,2,4-thiadiazole series and $R^3$ is hydrogen or CN.

In the process, the dyes (I) give strong dyeings which have good light fastness and are resistant to chemical substances.

6 Claims, 1 Drawing Sheet

U.S. PATENT DOCUMENTS

| | | | |
|---|---|---|---|
| 4,505,857 | 3/1985 | Egli | 534/768 |
| 4,614,521 | 9/1986 | Niwa et al. | 8/471 |
| 4,698,651 | 10/1987 | Moore et al. | 8/471 |
| 4,701,439 | 10/1987 | Weaver et al. | 8/471 |
| 4,764,178 | 8/1988 | Gregory et al. | 8/471 |
| 4,777,159 | 10/1988 | Taguchi et al. | 8/471 |

FOREIGN PATENT DOCUMENTS

| | | |
|---|---|---|
| 60-229787 | 11/1985 | Japan . |
| 60-229788 | 11/1985 | Japan . |
| 60-229791 | 11/1985 | Japan . |
| 60-239290 | 11/1985 | Japan . |
| 60-239291 | 11/1985 | Japan . |
| 239292 | 11/1985 | Japan . |
| 61-041596 | 2/1986 | Japan . |
| 1158996 | 7/1969 | United Kingdom . |
| 1379233 | 1/1975 | United Kingdom . |
| 1380104 | 1/1975 | United Kingdom . |
| 2159971 | 8/1977 | United Kingdom . |
| 2163768 | 3/1986 | United Kingdom . |

OTHER PUBLICATIONS

Patent Abstracts of Japan, Band 10, Nr. 196 (M-497) [2252], Jul. 10, 1986; JP-A-61 41 596 (Matsushita Electric Ind. Co., Ltd.) 27-02-1986.

Patent Abstracts of Japan, Band 10, Nr. 109 (M-472) [2166], Apr. 23, 1986; JP-A-60 239 291 (Mitsubishi Kasei Kogyo K.K.) 28-11-1985.

Patent Abstracts of Japan, Band 10, Nr. 109 (M-472), [2166], Apr. 23, 1986; JP-A-60 239 290 (Mitsubishi Kasei Kogyo K.K.), 28-11-1985.

Patent Abstracts of Japan, Band 10, Nr. 92 (M-468), [2149], Apr. 9, 1986; JP-A-60 229 791 (Matsushita Denki Sangyo K.K.), 15-11-1985.

Patent Abstracts of Japan, Band 9, Nr. 155 (M-392), [1878], Jun. 29, 1985; JP-A-60 30 392 (Mitsubishi Kasei Kogyo K.K.), 15-02-1985.

Patent Abstracts of Japan, Band 8, Nr. 189 (M-321) [1626], Aug. 30, 1984; JP-A-59 78 896 (Mitsubishi Kasei Kogyo, K.K.), 07-05-1984.

Patent Abstracts of Japan, Band 8, Nr. 189 (M-321) [1626], Aug. 30, 1984; JP-A-59 78 895 (Mitsubishi Kasei Kogyo K.K.), 07-05-1984.

Patent Abstracts of Japan, Band 10, Nr. 92 (M-468), [2149], Apr. 9, 1986; JP-A-60 229 786 (Matsushita Denki Sangyo K.K), 15-11-1985.

Patent Abstracts of Japan, Band 10, Nr. 92 (M-468), [2149], Apr. 9, 1986; JP-A-60 229 788 (Matsushita Denki Sangyo K.K.), 15-11-1985.

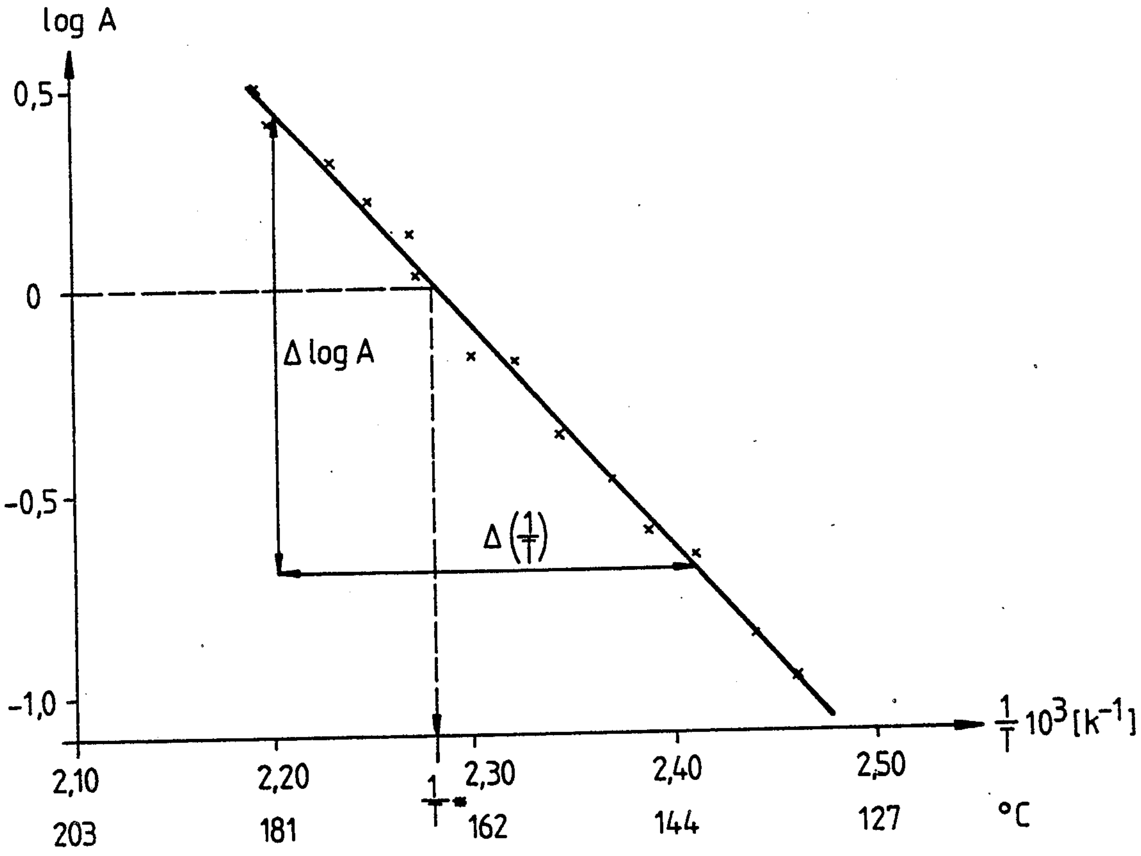
log A
0,5
0
-0,5
-1,0
Δ log A
Δ(1/T)
1/T 10³ [k⁻¹]
2,10
2,20
2,30
2,40
2,50
1/T*
°C
203
181
162
144
127

TRANSFERRING DYES FOR THERMAL PRINTING: TRI-CYANO-VINYL ANILINE DYES

This application is a continuation of application Ser. No. 07/228,874, filed on Aug. 5, 1988, now abandoned, which is a continuation of application Ser. No. 07/089,542, filed on Aug. 26, 1987, now abandoned.

In the sublimation transfer process, a transfer sheet which contains a sublimable dye with or without a binder on a carrier is heated from the rear by short heat pulses (lasting fractions of a second) using a thermal printing head, the dye being sublimed or vaporized and transferred to a receiving medium. The essential advantage of this process is that the amount of dye to be transferred (and hence the color gradation) can readily be controlled by adjusting the energy to be supplied to the thermal printing head.

In general, the color image is produced using the three subtractive primary colors, yellow, magenta and cyan (and if necessary black). In order to permit an optimum color image to be produced, the dyes must have the following properties:

(i) readily sublimable or vaporizable; in general, this requirement is most difficult to meet in the case of the cyan dyes;

(ii) high thermal and photochemical stability and resistance to moisture and chemical substances;

(iii) suitable hues for subtractive color mixing;

(iv) a high molecular absorption coefficient;

(v) readily obtainable industrially.

Most of the known dyes used for thermal transfer printing do not adequately meet these requirements.

The prior art discloses dyes for this purpose.

JP-A 159091/1985 describes dyes of the formula

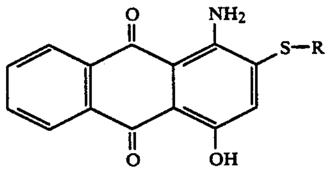

where R is alkyl, aralkyl, aryl or a 5-membered or 6-membered carbocyclic ring, for this purpose.

JP-A 30392/1985 discloses dyes of the formula

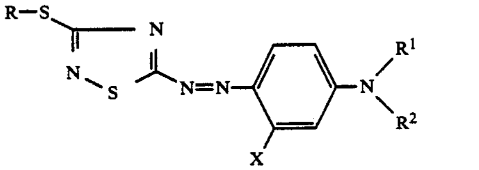

where R, $R^1$ and $R^2$ are each allyl, alkyl or alkoxyalkyl and X is H or methyl.

JP-A 229786/1985 describes dyes of the formula

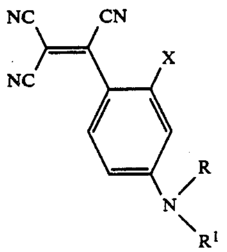

where R and $R^1$ are each methyl, ethyl, propyl or butyl and X is H or methyl, for this application.

In JP-A 239292/1985, dyes of the formula

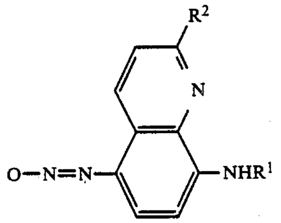

are described for the transfer process. In the formula, $R^1$ is $C_1$–$C_8$-alkyl, $R^2$ is H or methyl and D is

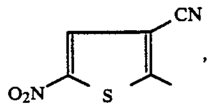 , 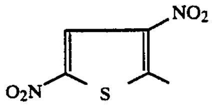 or 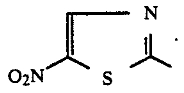

Quinone derivatives of the formula

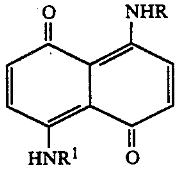

where R and $R^1$ are each methyl, ethyl, propyl or butyl, are described for this application in JP-A 229 786/1985.

Furthermore, the use of indoaniline dyes of the general formula

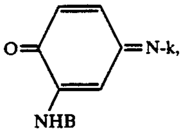

eg. 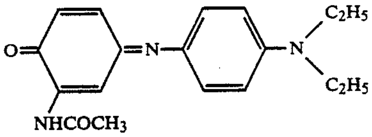

is described for this purpose in DE-A 35 24 519.

It is an object of the present invention to provide dyes which are readily sublimable or vaporizable under the conditions produced by a thermal printing head, do not undergo thermal or photochemical decomposition, can be processed to give printing inks and meet the color requirements. The dyes should also be readily obtainable industrially.

We have found that this object is achieved by a process for transferring dyes from a carrier by sublimation/vaporization with the aid of a thermal printing head to a plastic-coated paper, wherein a carrier is used on which dyes of the general formula

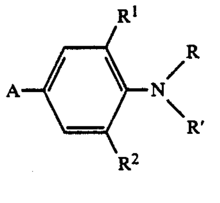

(I)

where A is D—N=N— or

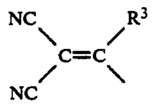

$R^1$ and $R^2$ independently of one another are each hydrogen, $C_1$–$C_4$-alkyl, $C_1$–$C_4$-alkoxy, $C_1$–$C_4$-alkylthio or halogen and $R^1$ together with R may form a 5-membered or 6-membered heterocyclic ring, and R and R' independently of one another are each hydrogen, phenyl which is unsubstituted or substituted by methyl or methoxy, or $C_5$- or $C_6$-cycloalkyl or $C_1$–$C_6$-alkyl which is unsubstituted or substituted by $C_1$–$C_4$-alkoxy, $C_1$–$C_4$-alkoxycarbonyl, $C_2$–$C_5$-alkanoyloxy, $C_1$–$C_4$-alkoxycarbonyloxy, $C_1$–$C_4$-alkoxy-$C_2$- or $C_3$-alkoxycarbonyloxy, hydroxyl, cyano, halogen, phenyl or $C_5$- or $C_6$-cycloalkyl, or

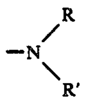

is a 5-membered or 6-membered heterocyclic ring, D is

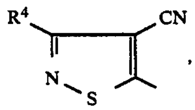,
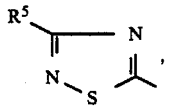,
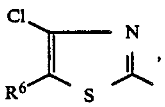, or
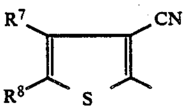

$R^3$ is hydrogen or CN, $R^4$ is $C_1$–$C_4$-alkyl, phenyl, benzyl or CN, $R^5$ is $C_1$–$C_4$-alkyl, $C_1$–$C_4$-alkylthio, $C_1$–$C_4$-alkoxy, $C_5$- or $C_6$-cycloalkyl, benzyl, $C_5$- or $C_6$-cycloalkylthio, $C_5$- or $C_6$-cycloalkoxy, benzyloxy or benzylthio, $R^6$ is CN or —CHO, $R^7$ is $C_1$–$C_4$-alkoxy, $C_1$–$C_4$-alkylthio or chlorine and $R^8$ is —CHO, CN or nitro, and $R^1$ and $R^2$ must not be hydrogen when A is

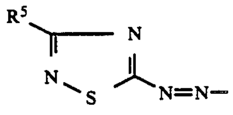

and $R^5$ is alkylthio or when A is

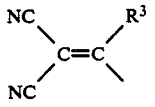

Compared with the dyes used in the conventional processes, those employed in the novel process possess better sublimability and in some cases greater lightfastness and greater resistance to chemical substances.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein the FIG. is a plot of the logarithm of the extinction coefficient of six samples of dyed polyester to which the dye of Example 23 has been transferred by heat at each of six different temperatures.

In the process of the invention, dyes of the general formula

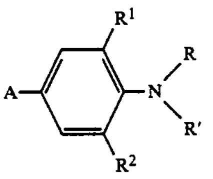

(I)

are used. In the formula, A is D—N=N— or

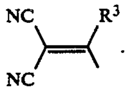.

In addition to being hydrogen, $R^1$ and $R^2$ are, for example, $C_1$–$C_4$-alkyl, such as $CH_3$, $C_2H5$, n-propyl, isopropyl, n-butyl, isobutyl or tert-butyl, $C_1$–$C_4$-alkoxy, such as methoxy, ethoxy, propoxy, isopropoxy, n-butoxy, isobutoxy or tert-butoxy, $C_1$–$C_4$-alkylthio, such as methylthio, ethylthio or butylthio or halogen, such as bromine, but preferably chlorine or fluorine. $R^1$ together with R may furthermore form a heterocyclic ring, so that

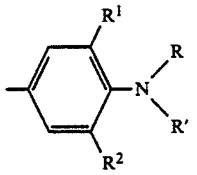

can correspond to the following formulae:

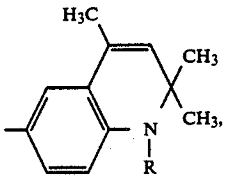 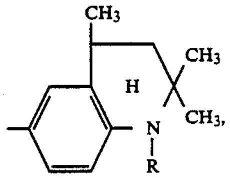

(IIa) (IIb)

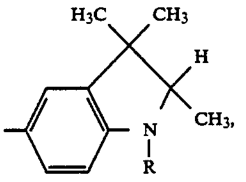 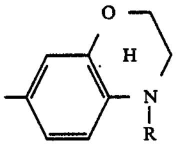

(IIc) (IId)

In the formulae (I) and (IIa) to (IId), R and R' independently of one another are each hydrogen or $C_1$-$C_6$-alkyl which is unsubstituted or substituted by $C_1$-$C_4$-alkoxy, $C_1$-$C_4$-alkoxycarbonyl, $C_1$-$C_4$-alkoxycarbonyloxy, $C_2$–$C_5$-alkanoyloxy, $C_1$–$C_4$-alkoxy-$C_2$- or $C_3$-alkoxycarbonyloxy, hydroxyl, cyano, halogen, phenyl or $C_5$- or $C_6$cycloalkyl.

Specific examples of $C_1$–$C_6$-alkyl are methyl, ethyl, propyl, isopropyl, n-butyl, isobutyl, tert-butyl, n-pentyl; isopentyl, n-hexyl and isohexyl.

Specific examples of $C_1$–$C_4$-alkoxy in the alkoxycarrying substituents are methoxy, ethoxy, n-propoxy, isopropoxy, n-butoxy and isobutoxy.

Suitable halogen substituents on $C_1$–$C_6$-alkyl are bromine, chlorine and preferably fluorine.

Specific examples of $C_2$–$C_5$-alkanoyl are acetyl, propionyl, butanoyl and pentanoyl.

R' and R may furthermore be phenyl which is unsubstituted or substituted by methyl or methoxy, or may be $C_5$- or $C_6$-cycloalkyl or benzyl.

Specific examples of substituted $C_1$–$C_6$-al-kyl are 2-hydroxyethyl, 2- and 3-hydroxypropyl, 3- and 4-hydroxybutyl, 2-cyanoethyl, 3-cyanopropyl and 4-cyanobutyl, benzyl, 2-phenylethyl and 2- and 3-phenylpropyl, methoxyethyl, 2- and 3-methoxypropyl, ethoxyethyl, n- and isopropoxyethyl and n- and isobutoxyethyl, 2-acetoxyethyl, 2-propanoyloxyethyl, 2-butanoyloxyethyl and 2-pentanoyloxyethyl, 2- and 3-acetoxypropyl, 2- and 3-propanoyloxypropyl, 2- and 3-butanoyloxypropyl and 2- and 3-pentanoyloxypropyl, 2-(methoxycarbonyl)-ethyl, 2-(ethoxycarbonyl)ethyl, 2-(propoxycarbonyl)-ethyl, 2-(butoxycarbonyl)ethyl and the corresponding 3-propyl derivatives, 2-(methoxycarbonyloxy)-ethyl, 2-(ethoxycarbonyloxy)-ethyl, 2-(n- and isopropoxycarbonyloxy)-ethyl, 2-(n- and isobutoxycarbonyloxy)-ethyl and the corresponding 3-(alkoxycarbonyloxy)-propyl derivatives, 2-(methoxyethoxycarbonyloxy)-ethyl, 2-(ethoxyethoxycarbonyloxy)-ethyl, 2-(n- and isopropoxyethoxycarbonyloxy)-ethyl and 2-(n- and isobutoxyethoxycarbonyloxy)-ethyl and the corresponding 3-(alkoxyalkoxycarbonyloxy)-propyl derivatives, and cyclopentylmethyl and cyclohexylmethyl.

Unsubstituted or substituted phenyl radicals R and R' are phenyl as well as 2- and 4-methylphenyl and 2- and 4-methoxyphenyl. Where R is phenyl or substituted phenyl, R' is preferably methyl and in particular hydrogen.

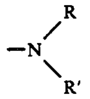

may furthermore be a heterocyclic radical, such as

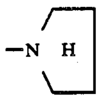, 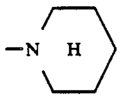 and 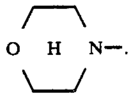

$R^3$ is hydrogen or CN.

D is a radical of the formula

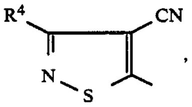, 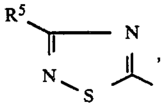,

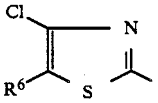 or 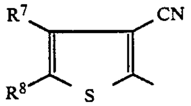

where $R^4$ is $C_1$–$C_4$-alkyl, such as methyl, ethyl, n-propyl, isopropyl, n-butyl, isobutyl, tert-butyl, phenyl, benzyl or CN, $R^5$ is $C_1$–$C_4$-alkyl, such as methyl, ethyl, n-propyl, isopropyl, n-butyl, isobutyl, or tert-butyl, $C_1$–$C_4$-alkoxy, such as methoxy, ethoxy, propoxy, isopropoxy, n-butoxy, isobutoxy or tert-butoxy, $C_1$–$C_4$-alkylthio, benzyl, $C_5$ or $C_6$-cycloalkyl, $C_5$- or $C_6$-cycloalkylthio, $C_5$- or $C_6$-cycloalkoxy, benzyloxy or benzylthio, $R^6$ is CN or —CHO, $R^7$ is $C_1$–$C_4$-alkoxy, such as methoxy, ethoxy, propoxy, isopropoxy, n-butoxy, isobutoxy, or tert-butoxy, $C_1$–$C_4$-alkylthio or chlorine, and $R^8$ is —CHO, CN or nitro.

Dyes (I) in which

A is

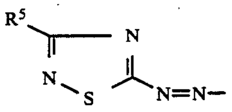

$R^5$ is alkylthio or

A is

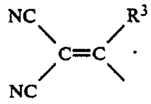

are excluded when $R^1$ and $R^2$ are each hydrogen.

The following are preferred for the present process:

(a) Dyes of the formula (I) where R and R' are each hydrogen or $C_1$–$C_4$-alkyl which is unsubstituted or substituted by hydroxyl, cyano or phenyl, or are each $C_1$–$C_4$-alkoxy-$C_2$-$C$-4-alkyl, $C_1$–$C_4$-alkoxycarbonyl-$C_1$–$C_4$-alkyl, $C_1$–$C_4$-alkoxycarbonyloxy-$C_2$–$C_4$-alkyl or $C_1$–$C_4$-fluoroalkyl, or phenyl which is unsubstituted or substituted by methoxy or methyl, $R^1$ and $R^2$ are each hydrogen, methyl, methoxy, n-propoxy, isopropoxy, n-butoxy, isobutoxy or tert-butoxy and A is D—N=N— or

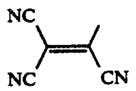

and where D is

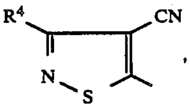 , 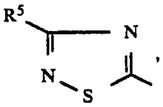 , 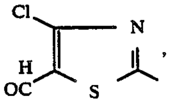 ,

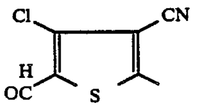 or 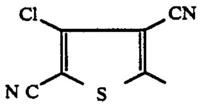

and where $R^4$ is methyl, ethyl, n-propyl, isopropyl, n-butyl, isobutyl, tert-butyl or cyano and $R^5$ is methyl, ethyl, n-propyl, isopropyl, n-butyl, isobutyl, tert-butyl, methylthio, ethylthio, n-propylthio, isopropylthio, n-butylthio, isobutylthio or tert-butylthio.

(b) Dyes of the formulae

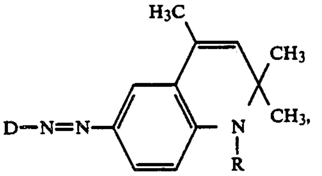

(IIIa)

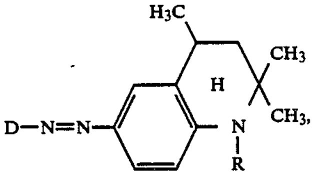

(IIIb)

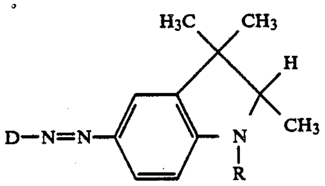

(IIIc)

and

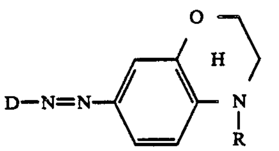

where D is

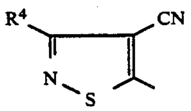 , 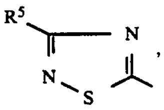 , 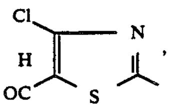 ,

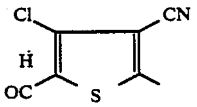 or 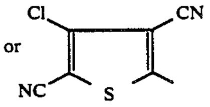 .

$R^4$ is methyl, ethyl, n-propyl, isopropyl, n-butyl, isobutyl, tert-butyl or CN, $R^5$ is methyl, ethyl, n-propyl, isopropyl, n-butyl, isobutyl, tert-butyl, methylthio, ethylthio, n-propylthio, isopropylthio, n-butylthio, isobutylthio or tert-butylthio and R is hydrogen, methyl, ethyl, n-propyl, isopropyl, n-butyl, isobutyl or tertbutyl.

Particularly preferred dyes are those of the formula

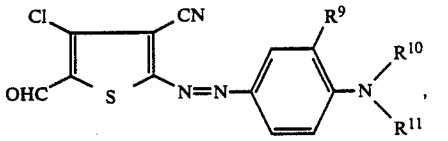 (IV)

where $R^9$ is hydrogen, $C_1$–$C_4$-alkoxy, such as methoxy, ethoxy, n-propoxy, isopropoxy, n-butoxy, isobutoxy or tertbutoxy, $R^{10}$ and $R^{11}$ independently of one another are each hydrogen, $C_1$–$C_4$-alkyl, such as methyl, ethyl, n-propyl, isopropyl, n-butyl, isobutyl or tert-butyl, $C_1$–$C_4$-alkoxycarbonylethyl or $C_2$–$C_5$-alkanoyloxyethyl, and those of the formulae (IIIa), (IIIb), (IIIc) and (IIId) where D is

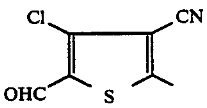 and

R is hydrogen, methyl, ethyl, n-propyl, isopropyl, n-butyl, isobutyl or tert-butyl.

Other particularly preferred dyes are those of the formula

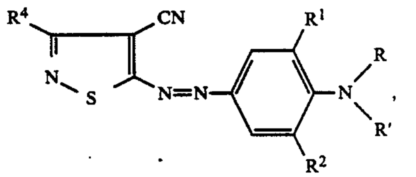 (V)

where R and R' independently of one another are each hydrogen, $C_1$–$C_4$-alkyl, such as methyl, ethyl, n-propyl, isopropyl, n-butyl, isobutyl or tert-butyl, phenyl, $C_2$–$C_5$-alkanoyloxyethyl, $C_1$–$C_4$-alkoxycarbonylethyl, $C_1$–$C_4$-alkoxycarbonyloxyethyl, benzyl or cyanoethyl, $R^1$ and $R^2$ independently of one another are each hydrogen, $C_1$–$C_4$-alkyl, such as methyl, ethyl, n-propyl, isopropyl, n-butyl, isobutyl or tert-butyl, $C_1$–$C_4$-alkoxy, such as methoxy, ethoxy, n-propoxy, isopropoxy, n-butoxy, isobutoxy or tert-butoxy, or $C_1$–$C_4$-thioalkyl, and $R^4$ is $C_1$–$C_4$-alkyl, such as methyl, ethyl, n-propyl, isopropyl, n-butyl, isobutyl or tert-butyl, or phenyl.

The dyes (I) are synthesized by conventional processes or processes known per se.

Azo dyes of the general formula (V) where R, R', $R^1$, $R^2$ and $R^4$ have the stated meanings, are prepared by the process described in German Laid-Open Application DOS 3,207,.290. The diazo component ($R^4$=CN)

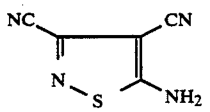

is disclosed in DE-A 34 02 024.Azo dyes (I) where D is

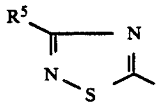

and $R^5$ is alkylthio have been synthesized by the process described in DE-C 15 44 391. Diazo components where $R^5$ is alkyl have been prepared by the synthesis described in Chem. Ber. 87 (1954), 57.

Azo dyes (I) where D is

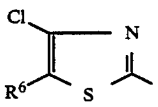

or

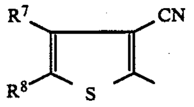

have been synthesized by the process described in DE-A 1 08 077 and 35 29 831, respectively.

Dyes of the type

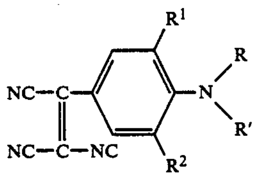

have been prepared by the process described by McKusick et al., J. Am. Chem. Soc. 80 (1958), 2806, by reacting the corresponding aniline derivatives with tetracyanoethylene.

Dyes (I) in which A is

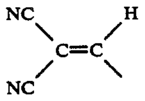

have been obtained by known processes, by reacting appropriate p-formylanilines with malodinitrile.

To prepare the dye carriers required for the process, the dyes in a suitable solvent, e.g. chlorobenzene or isobutanol, are processed with a. binder to give a printing ink. The latter contains the dye in dissolved or dispersed form. The printing ink is applied to the inert carrier by means of a knife coater, and the dying is dried in the air. Examples of suitable binders are ethylcellulose, polysulfones and polyethersulfones. Examples of inert carriers are tissue paper, blotting paper and glassine, as well as plastic films possessing good heat stability, for example uncoated or metal-coated polyester, nylon or polyimide. The carrier is preferably from 3 to 30 μm thick. Other carriers suitable for the novel process and binders and solvents for the preparation of the printing inks are described in DE-A 35 24 519.

Suitable dye-accepting layers are in principle all heat-stable plastic layers possessing an affinity for the dyes to be transferred, e.g. polyesters.

Transfer is effected by means of a thermal printing head, which must supply sufficient heating power to transfer the dye within a few milliseconds.

The embodiments which follow are intended to illustrate the invention further.

In order to be able to test the transfer behavior of the dyes quantitatively and in a simple manner, the thermal transfer is carried out using heating jaws having a large area, instead of a thermal printing head, and the dye carriers to be tested are prepared without the use of a binder.

(A) General formulations for coating the carriers with dye:

(AI)

1 g of ethylene glycol, 1 g of dispersant based on a condensate of phenol, formaldehyde and Na bisulfite, 7.5 g of water and 0.5 g of dye, together with 10 g of glass spheres (2 mm diameter)

are introduced into vessels and the latter are closed and shaken on a shaking apparatus (Red Devil ®) until the mean particle size of the dye is <1 μm (duration: from 8 to 12 hours, depending on the dye). The glass spheres are separated off by means of a sieve and the resulting dye dispersion, which may be diluted with water to twice its volume, is applied to paper using a 6 μm knife coater and dried in the air.

(AII) The dye is applied to the paper carrier once or several times in the form of a solution having a saturation of about 90% in a solvent (e.g. chlorobenzene, tetrahydrofuran, methyl ethyl ketone, isobutanol or a mixture of these) by the spin-coating method. The amount of dye applied by spin coating is adjusted so that, on complete transfer to an 80 μm thick polyester film (acceptor), an extinction of not less than 2 is obtained.

(B) Testing the sublimation/vaporization behavior The dyes used were tested in the following manner: The paper layer (donor) coated with the dye to be tested is placed with the dye layer on an 80 μm thick polyester film (acceptor) and pressed against it. The donor and acceptor are then wrapped with aluminum foil and heated for 30 seconds between two heated plates. The amount of dye which has migrated to the polyester film is determined photometrically. If the logarithm of the extinction A of the dyed polyester films measured at various temperatures (range: 100°-200° C.) is plotted against the associated reciprocal absolute temperature, straight lines are obtained from whose slope the activation energy $\Delta E_T$ for the transfer experiment is calculated:

$$\Delta E_T = 2.3 \cdot R \cdot \frac{\Delta \mathrm{Log}\, A}{\Delta\left(\frac{1}{T}\right)}$$

For complete characterization, the temperature $T^*$ [°C.] at which the extinction A of the dyed polyester film reaches the value 1 is additionally obtained from the plots.

EXAMPLES 1 TO 27

The dyes stated in Tables 1 to 6 were processed according to (AI) or (AII), and the sublimation behavior of the resulting dye-coated carriers was tested according to (B). The Table lists the hue on polyester and the thermal transfer parameters T* and $\Delta E_T$.

TABLE 1

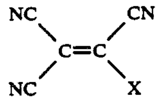

| Example | X | Hue | T*[°C.] | $\Delta E_T \left[\frac{kcal}{mol}\right]$ |
|---|---|---|---|---|
| 1 | 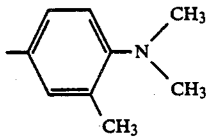 | magenta | 145 | 23 |
| 2 | 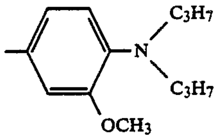 | violet | 156 | 16 |
| 3 | 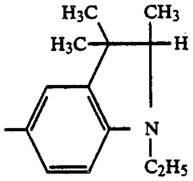 | magenta | 153 | 18 |
| 4 | 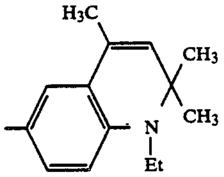 | violet | 174 | 23 |
| 5 | 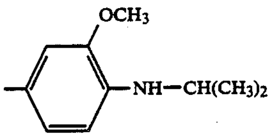 | magenta | 165 | 25 |
| 6 | 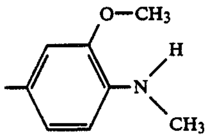 | magenta | 156 | 21 |
| 7 | 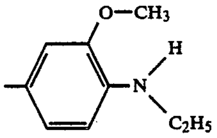 | magenta | 154 | 17 |
| 8 | 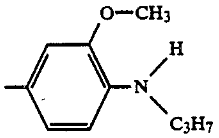 | magenta | 161 | 19 |

TABLE 1-continued
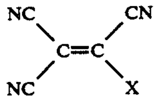
| Example | X | Hue | T*[°C.] | $\Delta E_T \left[\frac{kcal}{mol}\right]$ |
|---|---|---|---|---|
| 9 | 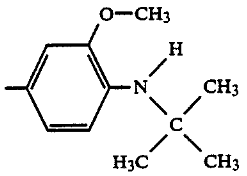 | magenta | 155 | 21 |
| 10 | 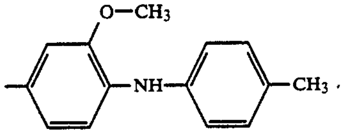 | magenta | 169 | 17 |
| 11 | 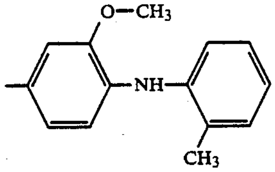 | magenta | 157 | 17 |
| 12 | 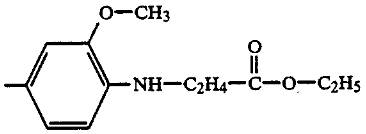 | magenta | 173 | 20 |
| 13 | 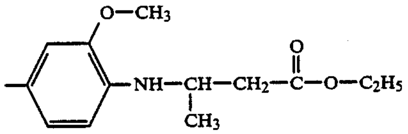 | magenta | 151 | 21 |
| 14 | 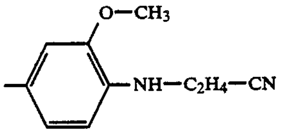 | red | 170 | 20 |
| 15 | 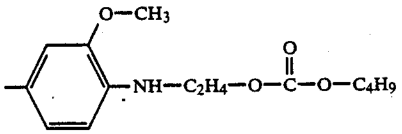 | magenta | 175 | 20 |
| 16 | 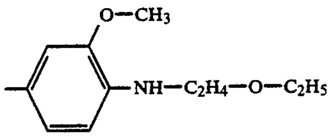 | magenta | 162 | 19 |
| 17 | 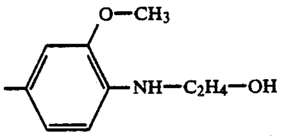 | magenta | 171 | 20 |

TABLE 1a
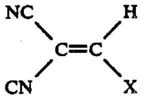
| Example | X | Hue | T*[°C.] | $\Delta E_T\left[\frac{kcal}{mol}\right]$ |
|---|---|---|---|---|
| 18 | 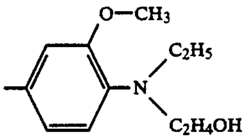 | yellow | 190 | 17 |
| 19 | 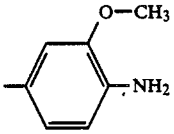 | greenish yellow | 121 | 26 |
| 20 | 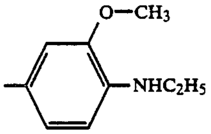 | yellow | 120 | 23 |
| 21 | 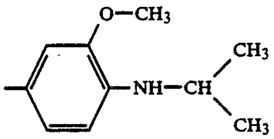 | yellow | 120 | 25 |
| 22 | 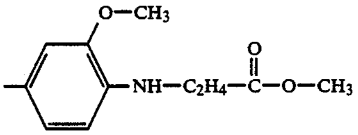 | yellow | 130 | 23 |
| 23 | 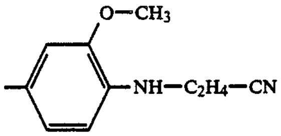 | yellow | 158 | 24 |
| 24 | 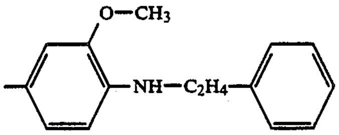 | yellow | 157 | 24 |
| 25 | 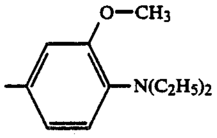 | reddish yellow | 130 | 20 |
| 26 | 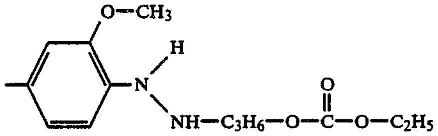 | yellow | 154 | 24 |

TABLE 1a-continued
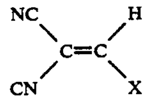
| Example | X | Hue | T*[°C.] | $\Delta E_T \left[\frac{kcal}{mol}\right]$ |
|---|---|---|---|---|
| 27 | 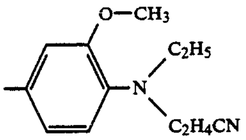 | yellow | 152 | 21 |
TABLE 2
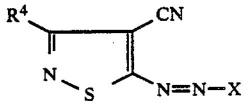
| Example | $R^4$ | X | Hue | T*[°C.] | $\Delta E_T \left[\frac{kcal}{mol}\right]$ |
|---|---|---|---|---|---|
| 28 | $-CH_3$ | 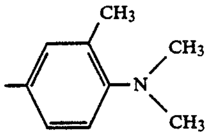 | magenta | 148 | 17 |
| 29 | $-CH_3$ | 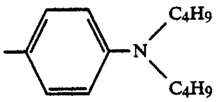 | magenta | 175 | 18 |
| 30 | H<br>$-C(CH_3)_2$ | 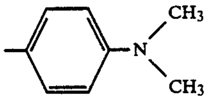 | magenta | 155 | 19 |
| 31 | H<br>$-C(CH_3)_2$ | 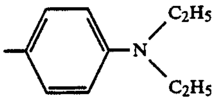 | magenta | 149 | 19 |
| 32 | $CH_3$ | 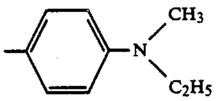 | magenta | 134 | 23 |
| 33 | $CH_3$ | 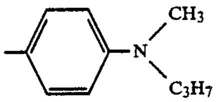 | magenta | 140 | 25 |
| 34 | $CH_3$ | 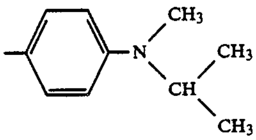 | magenta | 141 | 23 |
| 35 | $CH_3$ | 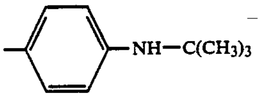 | red | 140 | 25 |

TABLE 2-continued
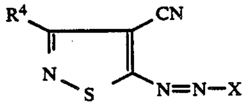
| Example | $R^4$ | X | Hue | T*[°C.] | $\Delta E_T \left[\frac{kcal}{mol}\right]$ |
|---|---|---|---|---|---|
| 36 | $CH_3$ | 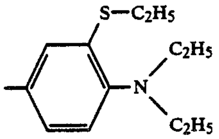 | red | 178 | 17 |
| 37 | $CH_3$ | 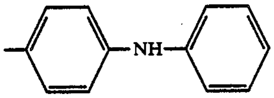 | magenta | 173 | 16 |
| 38 | 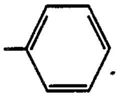 | 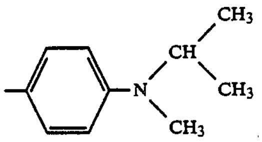 | magenta | 172 | 28 |
| 39 | 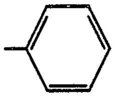 | 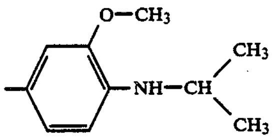 | magenta-violet | 200 | 19 |
| 40 | $-CH(CH_3)_2$ | 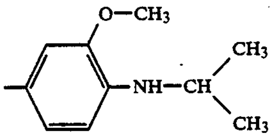 | magenta | 164 | 16 |
| 41 | $CH_3$ | 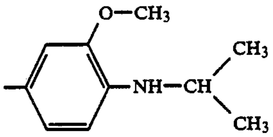 | magenta | 167 | 16 |
| 42 | $CH_3$ | 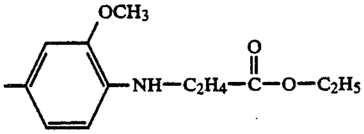 | magenta | 161 | 25 |
| 43 | $CH_3$ | 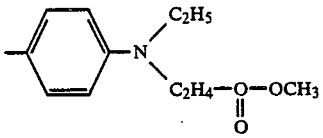 | magenta | 155 | 23 |
| 44 | $CH_3$ | 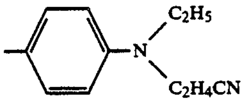 | red | 167 | 25 |
| 45 | $CH_3$ | 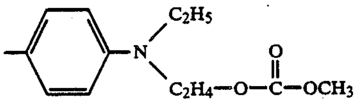 | magenta | 164 | 25 |

TABLE 2-continued
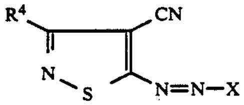
| Example | $R^4$ | X | Hue | T*[°C.] | $\Delta E_T \left[\frac{kcal}{mol}\right]$ |
|---|---|---|---|---|---|
| 46 | $CH_3$ | 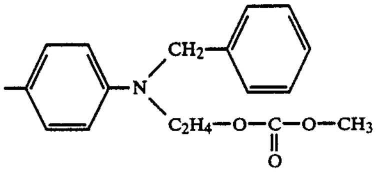 | magenta | 190 | 32 |
| 47 | $CH_3$ | 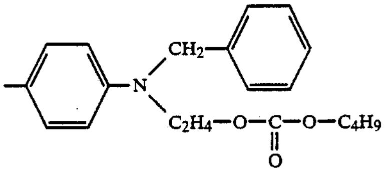 | magenta | 199 | 31 |
| 48 | $CH_3$ | 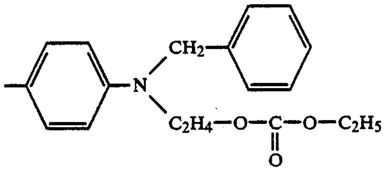 | magenta | 193 | 30 |
| 49 | $CH_3$ | 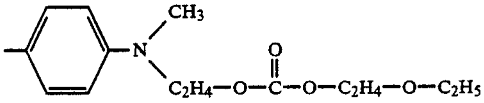 | magenta | 177 | 26 |
| 50 | $CH(CH_3)_2$ | 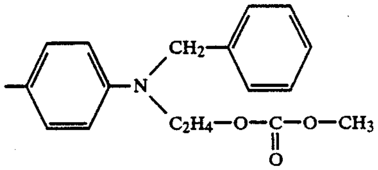 | magenta | 193 | 31 |
| 51 | $CH(CH_3)_2$ | 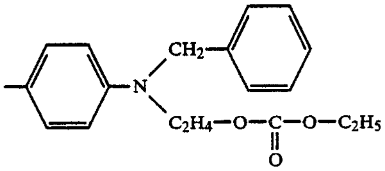 | magenta | 199 | 24 |
| 52 | $CH_3$ | 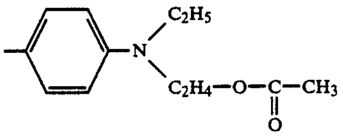 | magenta | 154 | 25 |

TABLE 3
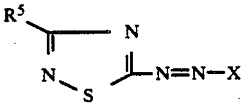
| Example | $R^5$ | X | Hue | T* [°C.] | $\Delta E_T$ [kcal/mol] |
|---|---|---|---|---|---|
| 53 | $-CH_3$ | 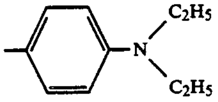 | reddish | 155 | 20 |
| 54 | $-SCH_3$ | 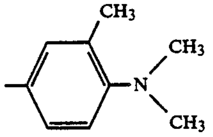 | reddish | 162 | 21 |
| 55 | $-CH_3$ | 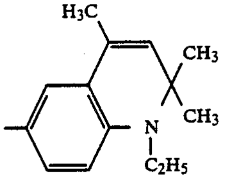 | violet | 172 | 23 |
| 56 | $-CH_3$ | 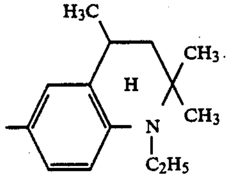 | violet | 170 | 22 |
TABLE 4
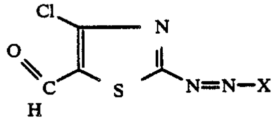
| Example | X | Hue | T* [°C.] | $\Delta E_T$ [kcal/mol] |
|---|---|---|---|---|
| 57 | 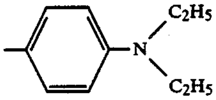 | violet | 180 | 20 |
| 58 | 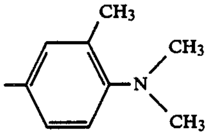 | violet | 172 | 19 |
TABLE 4-continued
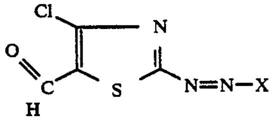
| Example | X | Hue | T* [°C.] | $\Delta E_T$ [kcal/mol] |
|---|---|---|---|---|
| 59 | 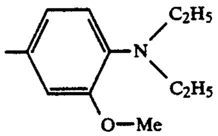 | reddish blue | 176 | 20 |
TABLE 5
| Example | X | Hue | T* [°C.] | $\Delta E_T$ [kcal/mol] |
|---|---|---|---|---|
| 60 | 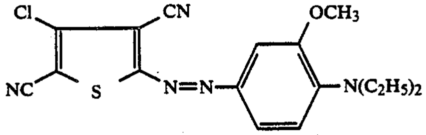 | blue | 170 | 25 |

TABLE 6
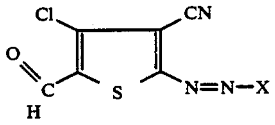
| Example | X | Hue | T* [°C.] | $\Delta E_T \left[\frac{kcal}{mol}\right]$ |
|---|---|---|---|---|
| 61 | 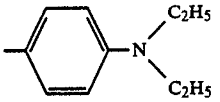 | reddish blue | 172 | 24 |
| 62 | 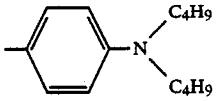 | reddish blue | 180 | 23 |
| 63 | 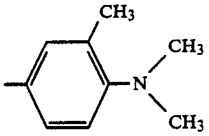 | reddish blue | 178 | 23 |
| 64 | 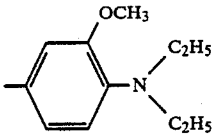 | cyan | 165 | 25 |
| 65 | 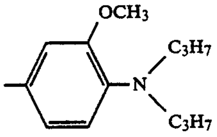 | cyan | 170 | 27 |
| 66 | 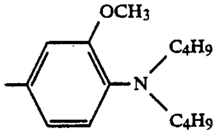 | cyan | 175 | 27 |
| 67 | 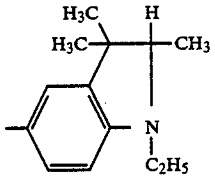 | blue | 169 | 24 |
| 68 | 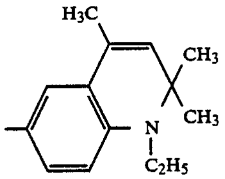 | cyan | 192 | 26 |
| 69 | 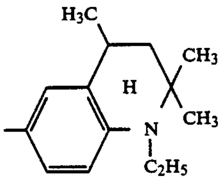 | cyan | 182 | 25 |

TABLE 6-continued
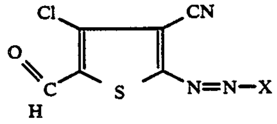
| Example | X | Hue | T* [°C.] | $\Delta E_T \left[\frac{kcal}{mol}\right]$ |
|---|---|---|---|---|
| 70 | 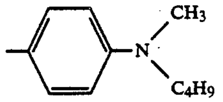 | reddish blue | 169 | 29 |
| 71 | 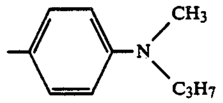 | reddish blue | 173 | 34 |
| 72 | 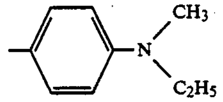 | reddish blue | 179 | 32 |
| 73 | 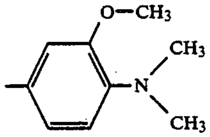 | neutral blue | 163 | 28 |
| 74 | 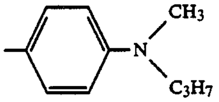 | reddish blue | 159 | 21 |
| 75 | 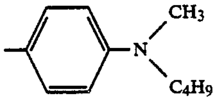 | reddish blue | 165 | 30 |
| 76 | 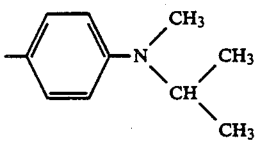 | reddish blue | 166 | 25 |
| 77 | 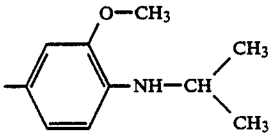 | violet | 185 | 25 |
| 78 | 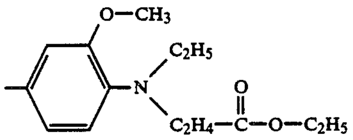 | neutral blue | 178 | 26 |
| 79 | 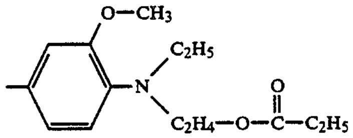 | neutral blue | 177 | 27 |

TABLE 6-continued

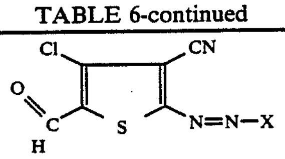

| Example | X | Hue | T* [°C.] | $\Delta E_T \left[\frac{kcal}{mol}\right]$ |
|---|---|---|---|---|
| 80 | 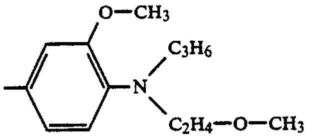 | cyan | 174 | 26 |

In the case of the dye of Example 23, samples were heated as described in (B) to the temperatures stated in Table 6, in each case for 30 seconds, after which the extinction of the dyeing on polyester was determined. The extinctions and temperatures for 6 measured points are stated in Table 6.

TABLE 6

| Sample | 20.1 | 20.2 | 20.3 | 20.4 | 20.5 | 20.6 |
|---|---|---|---|---|---|---|
| t °C. | 137 | 146 | 154 | 158 | 168 | 176 |
| A | 0.137 | 0.247 | 0.435 | 0.659 | 1.094 | 2.08 |

In FIG. 1, the values are plotted in the form of log A against $$\frac{1}{T}\ [k^{-1}].$$

In the graph, $\Delta\log = 1.14$ when $$\Delta\frac{1}{T} = 0.209 \cdot 10^{-3} k^{-1},$$

from which $\Delta E_T$ can be calculated:

$$\Delta E_T = 2.3 \cdot R \cdot \frac{\Delta \text{Log } A}{\Delta\left(\frac{1}{T}\right)}$$

$$\text{ie.} \Delta E_T = 25\left[\frac{kcal}{mol}\right]$$

The graph furthermore gives $$\frac{1}{T^*} = 2.282 \cdot 10^{-3} \cdot k^{-1}$$

and hence $$T = 438\text{ K}$$
$$= 165^\circ\text{ C.}$$

We claim:

1. A process for transferring a dye from a carrier by sublimation/vaporization with the aid of a thermal printing head to a plastic-coated paper, said carrier employing a dye of the formula:

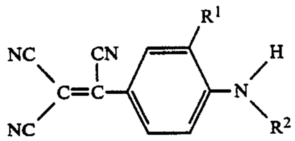

wherein $R^1$ is $C_1$-$C_4$-alkoxy, and $R^1$ is phenyl which is unsubstituted or substituted by methyl or methoxy, or is $C_1$-$C_6$-alkyl which is unsubstituted or substituted by $C_1$-$C_4$-alkoxy, $C_1$-$C_4$-alkoxycarbonyl, $C_2$-$C_5$-alkanoyloxy, $C_1$-$C_4$-alkoxycarbonyloxy, $C_1$-$C_4$-alkoxy-$C_2$- or $C_3$-alkoxycarbonyl, hydroxyl or cyano.

2. The process as claimed in claim 1, wherein $R^2$ is $C_1$-$C_4$alkyl which is unsubstituted or substituted by hydroxyl or cyano, or $R^2$ is $C_1$-$C_4$-alkoxy-$C_2$-$C_4$-alkyl, $C_1$-$C_4$-alkoxycarbonyl-$C_1$-$C_4$-alkyl or $C_1$-$C_4$-alkoxycarbonyloxy-$C_2$-$C_4$-alkyl.

3. The process as claimed in claim 1, wherein $R^1$ is methoxy.

4. The process as claimed in claim 2, wherein $R^1$ is methoxy.

5. The process as claimed in claim 1, wherein $R^2$ is $C_1$-$C_4$-alkyl, cyanoethyl, hydroxyethyl, $C_1$-$C_2$-alkoxyethy, $C_1$-$C_4$-alkoxycarbonyl-$C_2$-$C_3$-alkyl or methylphenyl.

6. The process as claimed in claim 3, wherein $R^2$ is $C_1$-$C_4$-alkyl, cyanoethyl, hydroxyethyl, $C_1$-$C_2$-alkoxyethyl, $C_1$-$C_4$-alkoxycarbonyl-$C_2$-$C_3$-alkyl or methylphenyl.

* * * * *

UNITED STATES PATENT AND TRADEMARK OFFICE

CERTIFICATE OF CORRECTION

PATENT NO. : 4,999,026

DATED : March 12, 1991

INVENTOR(S) : Bernhard Albert et al.

It is certified that error appears in the above-identified patent and that said Letters Patent is hereby corrected as shown below:

Column 30, line 34, " and $R^1$ is phenyl " should read--and $R^2$ is phenyl--.

Signed and Sealed this

Thirtieth Day of March, 1993

Attest:

STEPHEN G. KUNIN

Attesting Officer

Acting Commissioner of Patents and Trademarks